United States Patent
Bin Ismail et al.

(10) Patent No.: US 10,856,536 B2
(45) Date of Patent: Dec. 8, 2020

(54) DUAL-BEARING REEL

(71) Applicant: Shimano Components (Malaysia) SDN. BHD., Johor (MY)

(72) Inventors: Mohd Syamsul Johary Bin Ismail, Johor (MY); Abu Supian Bin Ahmad, Johor (MY); Baihaki Bin Sabtu, Johor (MY); Wong Kee Chuong, Johor (MY); Muhd Syukri Nazry Bin Mustapha, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 0 days.

(21) Appl. No.: 16/662,813

(22) Filed: Oct. 24, 2019

(65) Prior Publication Data

US 2020/0196586 A1 Jun. 25, 2020

(30) Foreign Application Priority Data

Dec. 25, 2018 (JP) .................................. 2018-241176

(51) Int. Cl.
*A01K 89/01* (2006.01)
*A01K 89/015* (2006.01)

(52) U.S. Cl.
CPC .............................. *A01K 89/0192* (2015.05)

(58) Field of Classification Search
CPC ........ A01K 89/01921; A01K 89/01922; A01K 89/01923

See application file for complete search history.

(56) References Cited

U.S. PATENT DOCUMENTS

| | | | |
|---|---|---|---|
| 5,873,535 A * | 2/1999 | Jeung ............... | A01K 89/01923 |
| | | | 242/314 |
| 6,032,894 A * | 3/2000 | Chapman ......... | A01K 89/01931 |
| | | | 242/310 |
| 9,439,408 B2 * | 9/2016 | Takechi ............... | A01K 89/015 |
| 9,572,334 B2 * | 2/2017 | Hyun .................... | A01K 89/02 |
| 9,668,466 B2 * | 6/2017 | Sim ................... | A01K 89/01921 |
| 10,342,225 B2 * | 7/2019 | Umezawa ........ | A01K 89/01921 |

(Continued)

FOREIGN PATENT DOCUMENTS

JP 6166558 B2 7/2017

*Primary Examiner* — Emmanuel M Marcelo
(74) *Attorney, Agent, or Firm* — United IP Counselors, LLC

(57) ABSTRACT

A dual-bearing reel includes a reel body and an attachment/detachment mechanism. The attachment/detachment mechanism includes an attachment/detachment operation portion, a first locking member and a second locking member. The first locking member is located on a side plate of the reel body. The second locking member is swingable relative to the first locking member. The attachment/detachment mechanism is configured to permit or restrict rotation of the attachment/detachment operation portion relative to the side plate by using the first locking member and the second locking member. When the attachment/detachment operation portion is operated to rotate while the second locking member is at a rotation-restricting position, an engagement portion presses an engaged portion such that swinging of the second locking member from the rotation-restricting position to a rotation-permitting position is restricted.

12 Claims, 8 Drawing Sheets

(56) References Cited

U.S. PATENT DOCUMENTS

2005/0224617 A1* 10/2005 Nakagawa ....... A01K 89/01922
242/310
2013/0320125 A1* 12/2013 Hyun ............... A01K 89/01923
242/312

* cited by examiner

DUAL-BEARING REEL

CROSS-REFERENCE TO RELATED APPLICATIONS

This application claims priority to Japanese Patent Application No. 2018-241176, filed Dec. 25, 2018. The contents of that application are incorporated by reference herein in their entirety.

BACKGROUND

Technical Field

The present invention relates to a dual-bearing reel.

Background Information

There is disclosed an attachment/detachment mechanism for a conventional dual-bearing reel (see Japanese Patent No. 6166558). The attachment/detachment mechanism includes a support member and a locking member. The support member is fixed to a first side plate. The locking member is swingably supported by the support member and the first side plate. The attachment/detachment mechanism is configured to permit or restrict rotation of a first side cover relative to the first side plate by using the support member and the locking member.

BRIEF SUMMARY

In the conventional dual-bearing reel described above, rotation of the first side cover is restricted while the locking member is at a rotation-restricting position (see FIG. 10). If a user pushes the first side cover toward the direction of rotation of the first side cover while the locking member is in this state, a protruding portion on the first side cover presses on an engagement groove in the locking member, and this pressing force may cause the locking member to rotate from the rotation-restricting position (position illustrated in FIG. 10) to a rotation-permitting position (position illustrated in FIG. 11).

More specifically, the attachment/detachment mechanism may permit rotation of the first side cover regardless of whether the attachment/detachment mechanism is restricting rotation of the first side cover. This phenomenon can be particularly prominent when the protruding portion on the first side cover is disposed eccentric from the center of swing of the locking member (see FIG. 13).

The present invention has been made in light of the aforementioned circumstance, and it is an object of the present invention to provide a dual-bearing reel having an attachment/detachment mechanism that can be reliably operated at a rotation-restricting position.

A dual-bearing reel according to one aspect of the present invention includes a reel body and an attachment/detachment mechanism. The reel body includes a frame with a side plate and a side cover for covering the side plate. The attachment/detachment mechanism includes an attachment/detachment operation portion, a first locking member and a second locking member. The attachment/detachment operation portion is operated when the side cover is attached to or detached from the side plate. The attachment/detachment operation portion is configured to be rotatable relative to the side plate.

The first locking member is mounted on the side plate. The second locking member is configured to be swingable relative to the first locking member. The attachment/detachment mechanism is configured to permit or restrict rotation of the attachment/detachment operation portion relative to the side plate by using the first locking member and the second locking member.

The attachment/detachment operation portion includes a first protruding portion that protrudes toward the side plate. The second locking member swings between a rotation-permitting position at which rotation of the attachment/detachment operation portion is permitted and a rotation-restricting position at which rotation of the attachment/detachment operation portion is restricted. The second locking member includes a first recess and an engagement portion. The first recess engages with the first protruding portion. The engagement portion engages with the first locking member at a position different to the first recess.

The first locking member includes a second recess and an engaged portion. The second recess is open in a direction of rotation of the attachment/detachment operation portion. The first recess is disposed in the second recess. When the attachment/detachment operation portion is operated to rotate while the second locking member is at the rotation-restricting position, the engaged portion is pressed by the engagement portion such that the second locking member is restricted from swinging from the rotation-restricting position to the rotation-permitting position.

In this dual-bearing reel, the attachment/detachment mechanism is configured to permit or restrict rotation of the attachment/detachment operation portion relative to the side plate by using the first locking member and the second locking member. The engagement portion of the second locking member presses the engaged portion of the first locking member such that the second locking member is restricted from swinging from the rotation-restricting position to the rotation-permitting position when the attachment/detachment operation portion is operated to rotate while the second locking member is at the rotation-restricting position.

With this configuration, the second locking member can be reliably held at the rotation-restricting position even when the attachment/detachment operation portion is operated to rotate while the second locking member is at the rotation-restricting position. In other words, with this dual-bearing reel, the attachment/detachment mechanism can be reliably operated at the rotation-restricting position.

In a dual-bearing reel according to another aspect of the present invention, a direction of swing of the second locking member preferably includes a first swing direction and a second swing direction. The first swing direction is a direction of swing in which the second locking member swings from the rotation-permitting position to the rotation-restricting position about a center of swing. The second swing direction is a direction of swing in which the second locking member swings from the rotation-restricting position to the rotation-permitting position about the center of swing.

When the attachment/detachment operation portion is operated to rotate while the second locking member is at the rotation-restricting position, the engagement portion of the second locking member presses the first locking member in the first swing direction to restrict the second locking member from swinging from the rotation-restricting position to the rotation-permitting position by the pressing force. With this configuration, the attachment/detachment mechanism can be more reliably operated at the rotation-restricting position.

In a dual-bearing reel according to another aspect of the present invention, the engagement portion of the second locking member is preferably a second protruding portion that protrudes toward the attachment/detachment operation portion. With this configuration, the engagement portion of the second locking member can be easily engaged with the engaged portion of the first locking member.

In a dual-bearing reel according to another aspect of the present invention, the center of swing of the second locking member is preferably at a position different to a center of rotation of the attachment/detachment operation portion. With this configuration, rotation of the attachment/detachment operation portion can be easily restricted using the second locking member.

In a dual-bearing reel according to another aspect of the present invention, the engaged portion is preferably an elongated hole extending in the direction of swing of the second locking member. With this configuration, the engagement portion of the second locking member can be easily engaged with the engaged portion of the first locking member and the second locking member can easily be made to swing.

In a dual-bearing reel according to another aspect of the present invention, the first recess is preferably located between the engaged portion and an opening in the second recess. With this configuration, a pressing force that restricts the second locking member from swinging from the rotation-restricting position to the rotation-permitting position can be suitably applied from the engagement portion of the second locking member to the engaged portion of the first locking member.

In a dual-bearing reel according to another aspect of the present invention, the engaged portion preferably includes a first end portion and a second end portion. In this case, the first end portion engages with the engagement portion when the second locking member is at the rotation-restricting position. The second end portion is disposed on a side opposite to the first end portion in a direction of swing in which the second locking member swings from the rotation-restricting position to the rotation-permitting position. The second end portion engages with the engagement portion when the second locking member is at the rotation-permitting position.

A first distance between the first end portion and the center of rotation of the attachment/detachment operation portion is longer than a second distance between the second end portion and the center of rotation of the attachment/detachment operation portion. With this configuration, the pressing force that restricts the second locking member from swinging from the rotation-restricting position to the rotation-permitting position can be suitably applied from the engagement portion of the second locking member to the engaged portion of the first locking member.

In a dual-bearing reel according to another aspect of the present invention, preferably, a third distance between the center of swing of the second locking member and the center of rotation of the attachment/detachment operation portion is shorter than the first distance and longer than the second distance.

With this configuration, the pressing force that restricts the second locking member from swinging from the rotation-restricting position to the rotation-permitting position can be more suitably applied from the engagement portion of the second locking member to the engaged portion of the first locking member.

In a dual-bearing reel according to another aspect of the present invention, while the engagement portion of the second locking member is engaged with the first end portion of the engaged portion, the opening in the first recess of the second locking member is preferably disposed to face an inner peripheral surface of the second recess in the first locking member. In this case, in a state where the engagement portion of the second locking member is engaged with the second end portion of the engaged portion, the opening in the first recess in the second locking member is disposed to face the opening in the second recess in the first locking member.

With this configuration, the second locking member can be reliably held at the rotation-restricting position while the second locking member is at the rotation-restricting position. Further, the attachment/detachment operation portion can be easily operated to rotate while the second locking member is at the rotation-permitting position.

According to the present invention, an attachment/detachment mechanism in a dual-bearing reel can be reliably operated at a rotation-restricting position.

DETAILED DESCRIPTION

Figure 1:
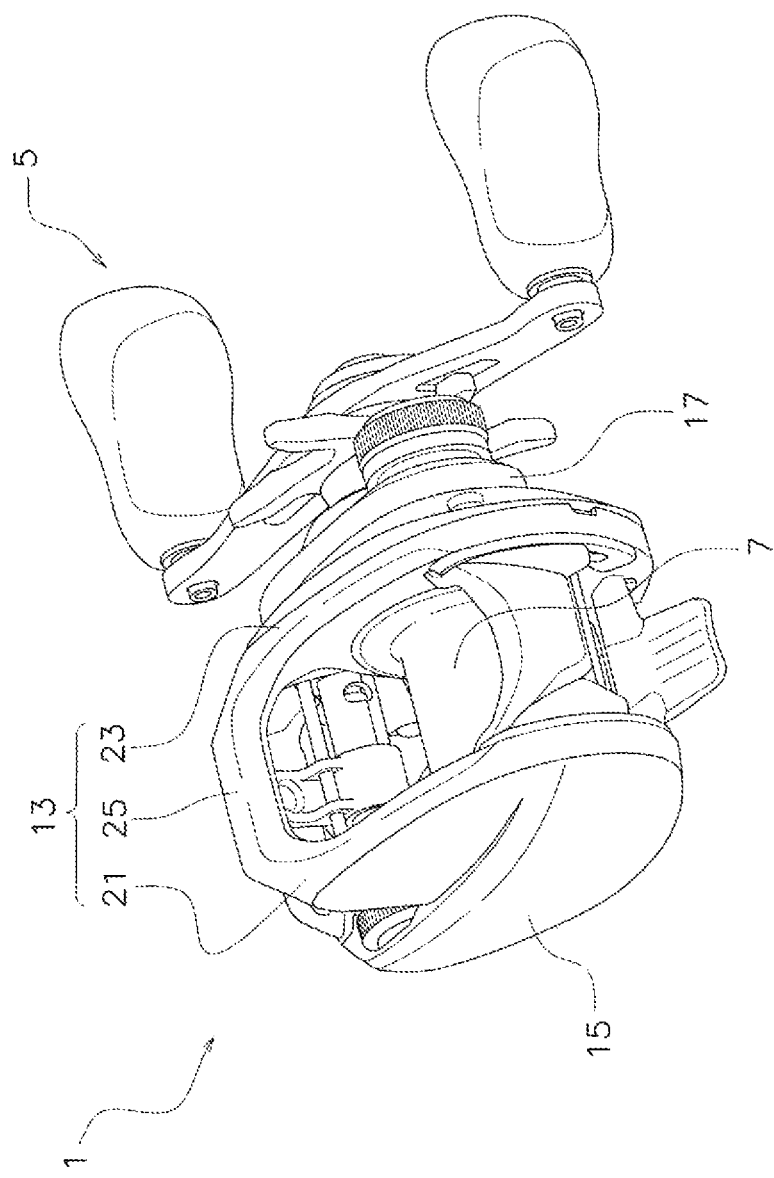
FIG. 1 is a perspective view of a dual-bearing reel according to an embodiment of the present invention.

As illustrated in FIG. 1, a dual-bearing reel 1 according to an embodiment of the present invention includes a reel body 3 and an attachment/detachment mechanism 11. More specifically, the dual-bearing reel 1 includes the reel body 3, a handle 5, a spool 7, a spool shaft 9 (see FIG. 3) and the attachment/detachment mechanism 11 (see FIGS. 2 and 3).

In this embodiment, an "axial direction" is defined as a direction in which a shaft center X (spool shaft center X) of the spool shaft 9 extends. A "radial direction" is defined as a radial direction away from the spool shaft center X. A "circumferential direction" is defined as a circumferential direction about the spool shaft center X.

<Reel Body>

As illustrated in FIG. 1, the reel body 3 includes a frame 13 and a first side cover 15 (example of a side cover and attachment/detachment operation portion). The reel body 3 further includes a second side cover 17 and a shaft support portion 19 (see FIG. 3).

More specifically, the reel body 3 includes the frame 13, the first side cover 15, the second side cover 17 and the shaft support portion 19. The first side cover 15 and the shaft support portion 19 may be interpreted as examples of an attachment/detachment operation portion.

Figure 4:
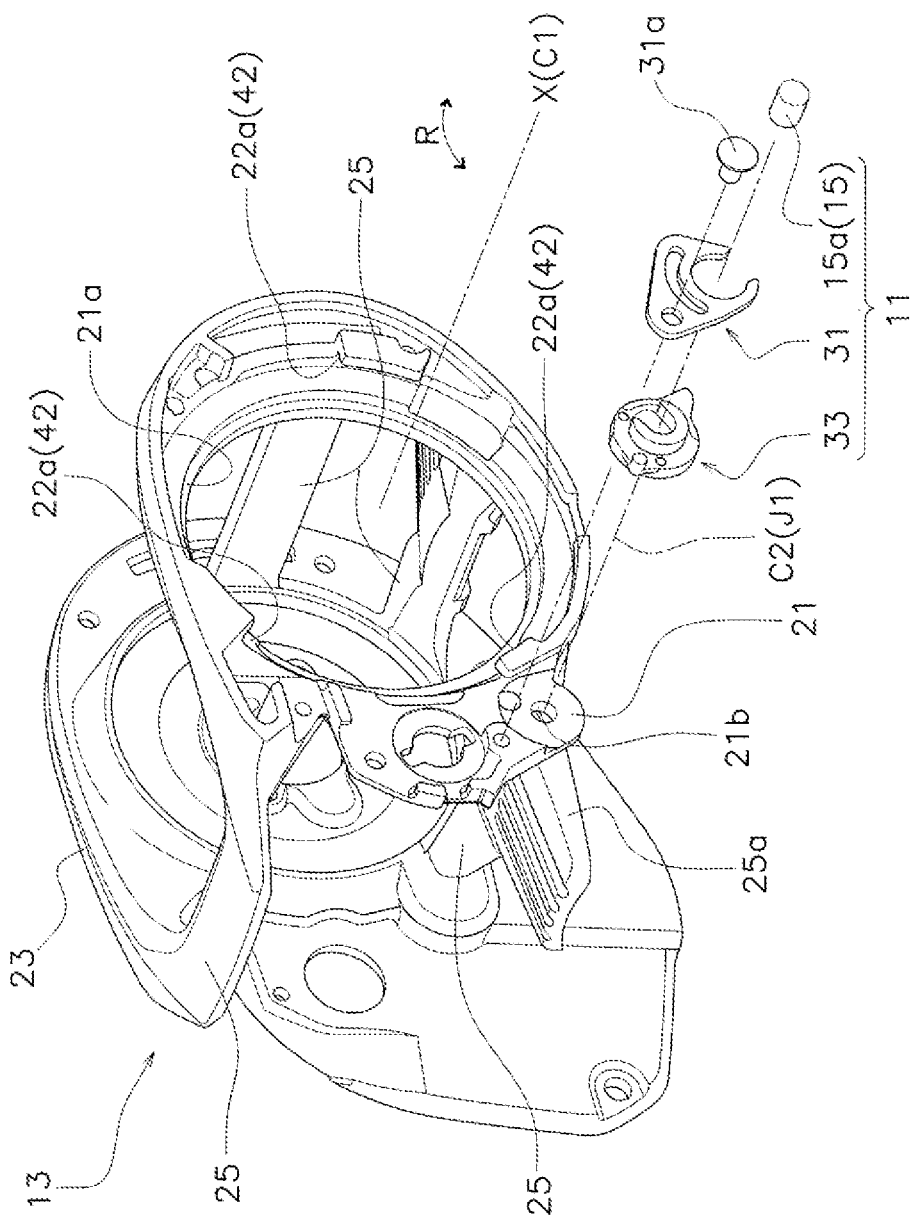
FIG. 4 is a perspective view for illustrating the positional relationship between a frame and an attachment/detachment mechanism.

As illustrated in FIG. 4, the frame 13 includes a first side plate 21 (example of a side plate), a second side plate 23 and a plurality of linking members 25.

Figure 3:
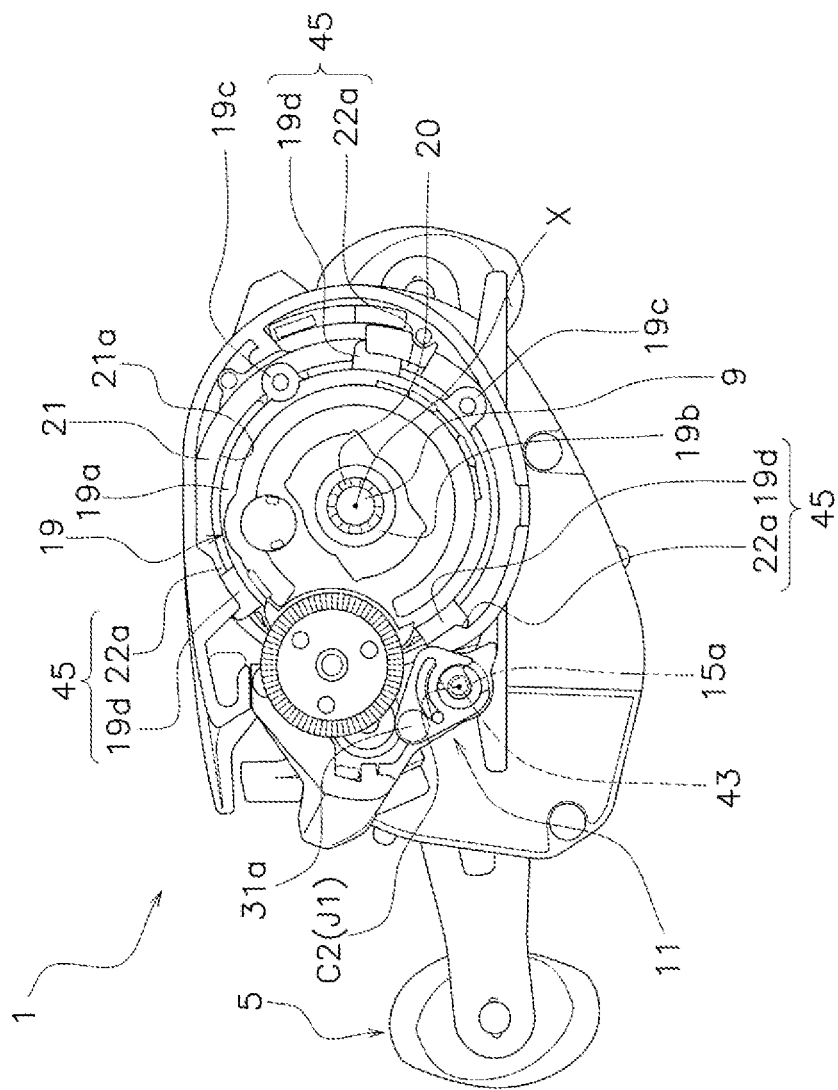
FIG. 3 is a side view of the dual-bearing reel where a first side cover has been removed.

As illustrated in FIGS. 3 and 4, the first side plate 21 includes an opening 21a. The first side plate 21 includes attached portions used to attach the shaft support portion 19. The attached portions can be, for example, a plurality of bayonet grooves 22a that make up a bayonet structure 42 (described later). The second side plate 23 is disposed at a predetermined distance away from the first side plate 21 and faces the first side plate 21.

As illustrated in FIG. 4, the plurality of linking members 25 link the first side plate 21 to the second side plate 23. The plurality of linking members 25 are formed integrally with the first side plate 21 and the second side plate 23. A rod mounting portion 25a for mounting a fishing rod is formed integrally with one of the plurality of linking members 25, for example, a lower one of the linking members 25.

Figure 2:
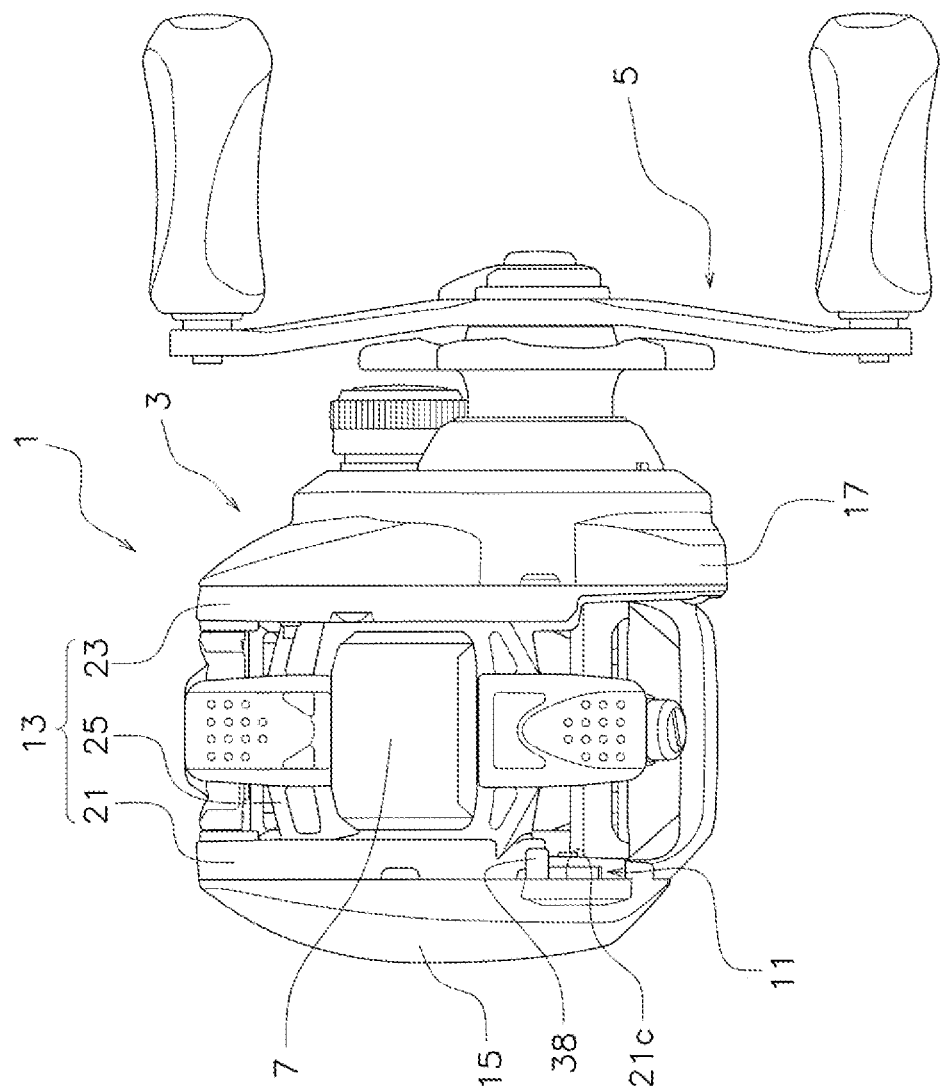
FIG. 2 is a diagram of the dual-bearing reel when viewed from below.

As illustrated in FIGS. 1 and 2, the first side cover 15 covers the external side of the first side plate 21. The first side cover 15 is rotatably mounted on the second side plate 23. The second side cover 17 covers the external side of the second side plate 23. The second side cover 17 is fixed to the second side plate 23 using a fixing member, for example, a screw member.

As illustrated in FIG. 3, the shaft support portion 19 supports the spool shaft 9. The shaft support portion 19 is removably mounted on the first side plate 21 using the bayonet structure 42.

The shaft support portion 19 includes a bottomed cylindrical portion 19a, a bearing housing portion 19b and a mounting portion 19c mounted on the first side plate 21. The bottomed cylindrical portion 19a is formed to have a cylindrical shape with a bottom.

The bearing housing portion 19b is located on the bottom portion of the bottomed cylindrical portion 19a, for example, at a central portion of the bottom portion. The bearing housing portion 19b is formed to have a cylinder having a diameter smaller than that of the bottomed cylindrical portion 19a. A bearing 20 is housed in an inner peripheral portion of the bearing housing portion 19b. The bearing 20 supports one end of the spool shaft 9.

The mounting portion 19c is disposed on an outer peripheral surface of the bottomed cylindrical portion 19a. The mounting portion 19c is fixed to the first side cover 15 using a fixing member, for example, a screw member. A plurality of bayonet protrusions 19d (described later) that make up the bayonet structure 42 are formed on the outer peripheral surface of the bottomed cylindrical portion 19a. In other words, the shaft support portion 19 is removably mounted on the first side plate 21 using the bayonet structure 42 while being fixed to the first side cover 15.

<Handle, Spool and Spool Shaft>

As illustrated in FIGS. 1 and 2, the handle 5 is disposed on the side of the reel body 3. This embodiment deals with an example in which the handle 5 is disposed on the side of the second side cover 17, but the handle 5 can be disposed on the side of the first side cover 15. The handle 5 is mounted on a drive shaft (not shown) so as to integrally rotate with the drive shaft.

A fishing line is wound around the spool 7. The spool 7 is disposed between the first side plate 21 and the second side plate 23 through the opening 21a (see FIG. 4) in the first side plate 21. The spool 7 is rotatably mounted on the reel body 3 using the spool shaft 9. The center of rotation of the spool 7 is concentric with the center of the spool shaft 9.

The spool 7 is mounted on the spool shaft 9 such that the spool 7 can integrally rotate with the spool shaft 9. The spool shaft 9 is rotatably mounted on the reel body 3. The method of supporting the spool shaft with the reel body 3 is substantially the same as in the prior art, and hence only a brief description is provided herein.

As described above, one end of the spool shaft 9 is rotatably supported by the shaft support portion 19. The other end of the spool shaft 9 is rotatably supported by the second side cover 17. A substantially central portion of the spool shaft 9 is rotatably supported by the second side plate 23.

<Attachment/Detachment Mechanism>

As illustrated in FIG. 4, the attachment/detachment mechanism 11 includes the first side cover 15 (see FIGS. 1 and 2), a support member 31 (example of a first locking member) and a locking member 33 (example of a second locking member). The attachment/detachment mechanism 11 is configured to permit or restrict rotation of the first side cover 15 relative to the first side plate 21 by using the support member 31 and the locking member 33.

The attachment/detachment mechanism 11 further includes the bayonet structure 42 (see FIG. 3). The attachment/detachment mechanism 11 uses the bayonet structure 42 to rotate the first side cover 15 relative to the first side plate 21. The attachment/detachment mechanism 11 also uses the bayonet structure 42 to position the first side cover 15 relative to the first side plate 21.

(First Side Cover)

The first side cover 15 is operated when the first side cover 15 is to be attached to or detached from the first side plate 21. The first side cover 15 is configured to be attached to or detached from the first side plate 21 and rotate relative to the first side plate 21.

More specifically, as described above, the first side cover 15 is rotatably and detachably mounted on the first side plate 21 using the shaft support portion 19. A center of rotation C1 of the first side cover 15 is defined on the spool shaft center X.

The first side cover 15 includes a first protruding portion 15a (see FIGS. 3 and 4) that protrudes toward the first side plate 21. The first protruding portion 15a protrudes toward the first side plate 21 from an inner surface of the first side cover 15. The first protruding portion 15a is, for example, formed to have a columnar shape.

Figure 5A:
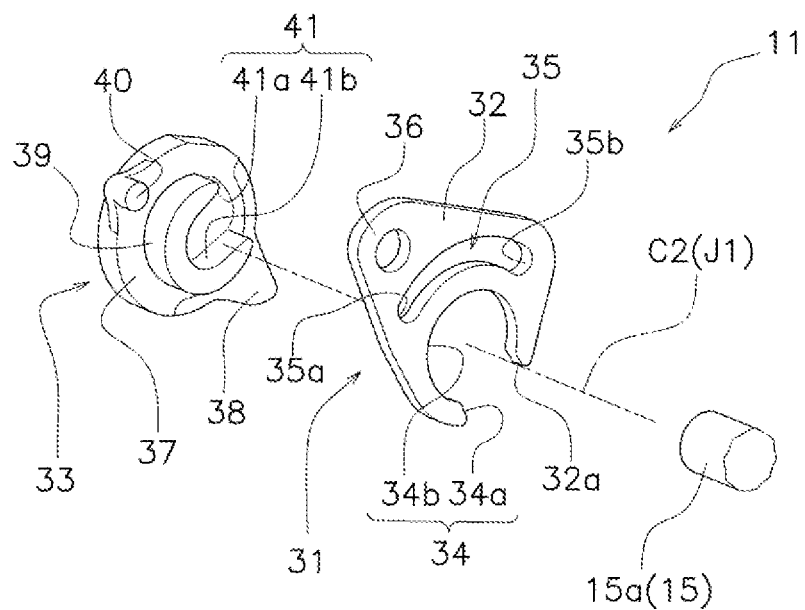
FIG. 5A is an enlarged perspective view of the attachment/detachment mechanism.

As illustrated in FIG. 5A, the first protruding portion 15a engages with a second recess 41 (described later) formed in the locking member 33. More specifically, the first protruding portion 15a engages with the second recess 41 in the locking member 33 such that a shaft center J1 of the first protruding portion 15a aligns with a center of swing C2 of the locking member 33. The first protruding portion 15a is used as a restricting shaft that restricts rotation of the first side cover 15.

(Support Member)

As illustrated in FIG. 4, the first side plate 21 has the support member 31. The support member 31 is fixed to the first side plate 21 using a fixing member, for example, a bolt 31a. The support member 31 swingably supports the locking member 33.

As illustrated in FIG. 5A, the support member 31 includes a first recess 34 (example of a second recess in the claims) and an engaged portion 35. More specifically, the support member 31 includes a first body portion 32, the first recess 34, the engaged portion 35 and a fixing portion 36.

The first body portion 32 is formed to have a substantially plate shape. The first recess 34 is formed in the first body portion 32. For example, the first recess 34 is formed to be recessed from an edge portion 32a of the first body portion 32.

Figure 6A:
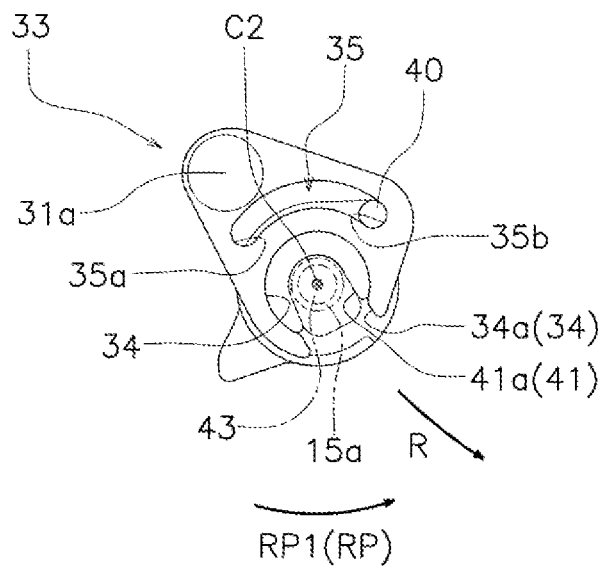
FIG. 6A is a side view of the attachment/detachment mechanism in a case where the locking member is at a rotation-permitting position.

As illustrated in FIG. 6A, the first recess 34 is open in a direction of rotation R of the first side cover 15. More specifically, the first recess 34 is open in the direction of rotation R of the first side cover 15 while the support member 31 is fixed to the first side plate 21. The second recess 41 in the locking member 33 is disposed in the first recess 34.

The first recess 34 has a first opening 34a and a first inner peripheral surface 34b. The first opening 34a is formed between the edge portion 32a of the first body portion 32 and the first inner peripheral surface 34b. The first opening 34a is formed such that the first protruding portion 15a can be guided in the direction of rotation R of the first side cover 15. A bottom portion of the first inner peripheral surface 34b is a substantially flat, arc-shaped surface. A portion between the bottom portion of the first inner peripheral surface 34b and the first opening 34a is formed as a substantially flat surface.

Figure 6B:
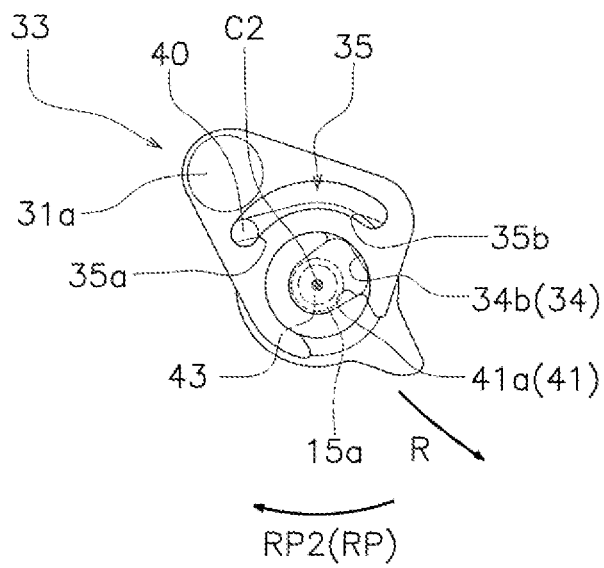
FIG. 6B is a side view of the attachment/detachment mechanism in a case where the locking member is at a rotation-restricting position.

As illustrated in FIGS. 6A and 6B, an engagement portion 40 on the locking member 33 engages with the engaged portion 35. The engagement portion 40 presses the engaged portion 35. The engaged portion 35 is an elongated hole extending in a direction of swing RP of the locking member 33.

Here, the direction of swing RP includes a first direction of swing RP1 and a second direction of swing RP2. The first direction of swing RP1 is a direction of swing RP in which the locking member 33 swings from a rotation-permitting position to a rotation-restricting position about the center of swing C2. The second direction of swing RP2 is a direction of swing RP in which the locking member 33 swings from the rotation-restricting position to the rotation-permitting position about the center of swing C2.

Here, the center of swing C2 of the locking member 33 is defined by the center of the arc-shaped first recess 34 (first inner peripheral surface 34b). Note that the center of swing C2 of the locking member 33 can be defined by the shaft center of a second protruding portion 39 (described later) of the locking member 33. The center of swing C2 of the locking member 33 can also be defined by a shaft center J2 of a third protruding portion 43 (described later) of the locking member 33.

As illustrated in FIG. 5A, the engaged portion 35 (elongated hole) has a first end portion 35a and a second end portion 35b located on a side opposite to the first end portion 35a in the direction of swing RP.

The second end portion 35b is one end portion of the engaged portion 35. For example, if the locking member 33 is at the rotation-permitting position (see FIG. 6A), the engagement potion 40 of the locking member 33 is disposed at the second end portion 35b.

The first end portion 35a is another end portion of the engaged portion 35. For example, if the locking member 33 is at the rotation-restricting position (see FIG. 6B), the engagement potion 40 of the locking member 33 is disposed at the first end portion 35a.

Figure 7:
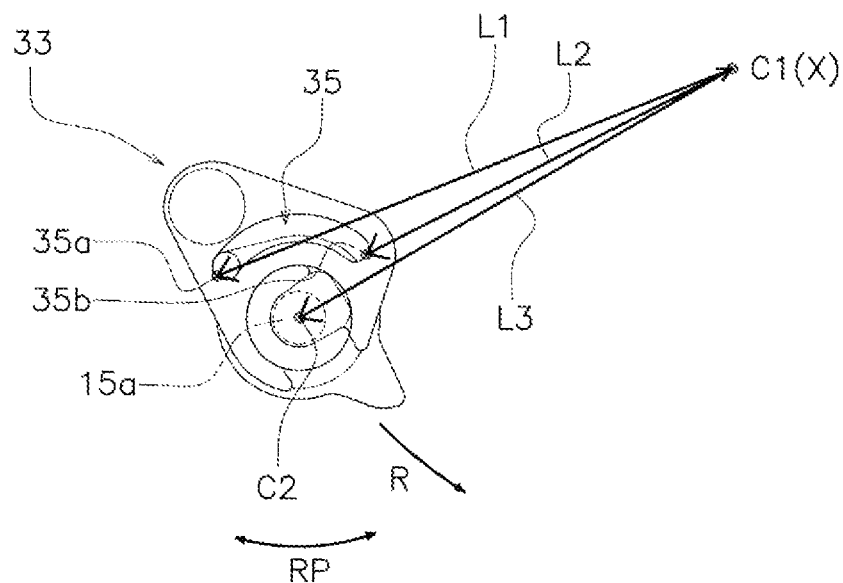
FIG. 7 is a diagram for explaining a position at which an engaged member in a support member is formed.

As illustrated in FIG. 7, a first distance L1 between the first end portion 35a and the center of rotation C1 of the first side cover 15 is longer than a second distance L2 between the second end portion 35b and the center of rotation C1 of the first side cover 15. In other words, the first end portion 35a and the second end portion 35b are disposed on the first body portion 32 such that the first distance L1 is longer than the second distance L2.

A third distance L3 between the center of swing C2 of the locking member 33 and the center of rotation C1 of the first side cover 15 is shorter than the first distance L1 and longer than the second distance L2. In other words, the first end portion 35a and the second end portion 35b are disposed on the first body portion 32 such that the first distance L1 is longer than the third distance L3 and the second distance L2 is shorter than the third distance L3.

A portion between the first end portion 35a and the second end portion 35b extends from the first end portion 35a (or the second end portion 35b) toward the second end portion 35b (or the first end portion 35a) along the second direction of swing RP2 (or the first direction of swing RP1).

The fixing portion 36 is a portion at which the support member 31 is fixed to the second side plate 23. At the fixing portion 36, the above-described bolt 31a (see FIG. 3) is screwed into the first side plate 21 to fix the support member 31 to an external side surface of the second side plate 23.

(Locking Member)

The locking member 33 can swing relative to the support member 31. The center of swing C2 of the locking member 33 is at a position different to the center of rotation C1 of the first side cover 15. The locking member 33 swings between the rotation-permitting position (see FIG. 6A) at which rotation of the first side cover 15 is permitted and the rotation-restricting position (see FIG. 6B) at which rotation of the first side cover 15 is restricted.

For example, if the locking member 33 swings in the first direction of swing RP1 while at the rotation-permitting position as illustrated in FIG. 6A, the orientation of the locking member 33 changes from a first orientation to a second orientation. If the locking member 33 swings in the second direction of swing RP2 while at the rotation-restricting position as illustrated in FIG. 6B, the orientation of the locking member 33 changes from the second orientation to the first orientation.

Figure 5B:
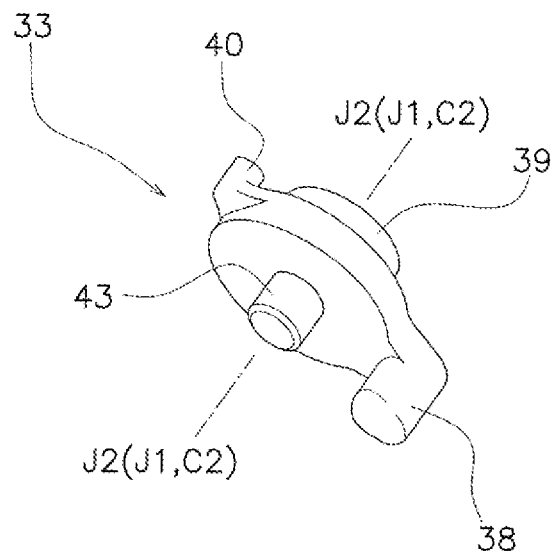
FIG. 5B is an enlarged perspective view of a locking member.

As illustrated in FIGS. 5A and 5B, the locking member 33 includes the second recess 41 (example of a first recess in the claims) and the engagement portion 40. More specifically, the locking member 33 includes a second body portion 37, a tab 38, the second protruding portion 39 (example of a third protruding portion in the claims) including the second recess 41, the third protruding portion 43 and the engagement portion 40.

—Second Body Portion and Handle—

As illustrated in FIGS. 5A and 5B, the second body portion 37 is disposed between the support member 31 and the first side plate 21. The tab 38 is a portion that is operated when swinging the locking member 33. The tab 38 is formed on the second body portion 37 and protrudes from the second body portion 37. The tab 38 is disposed outward of the first side cover 15 and the first side plate 21 through a hole 21c (see FIG. 2) formed between the first side cover 15 and the first side plate 21. With this configuration, the tab 38 can be operated externally to the reel body 3.

—Second Protruding Portion—

As illustrated in FIG. 5A, the second protruding portion 39 protrudes from the second body portion 37 and is formed to have a substantially columnar shape. The second protruding portion 39 is disposed in the first recess 34. For example, the second protruding portion 39 is swingably disposed in the first recess 34. When the second protruding portion 39 swings relative to the first recess 34, the outer peripheral surface of the second protruding portion 39 slides along the first inner peripheral surface 34b.

The second recess 41 is formed in the second protruding portion 39. For example, the second recess 41 is recessed from the outer peripheral surface of the second protruding portion 39.

The second recess 41 is disposed in the first recess 34 of the support member 31. More specifically, while the second protruding portion 39 is disposed in the first recess 34, the second recess 41 is disposed on an inner side of the first recess 34. In this state, the second recess 41 is disposed between the engaged portion 35 (elongated hole) and the first opening 34a in the first recess 34.

The first protruding portion 15a engages with the second recess 41. While the locking member 33 is at the rotation-permitting position, the first protruding portion 15a is permitted to be released from the second recess 41 (see FIG. 6A). While the locking member 33 is at the rotation-restricting position, the first protruding portion 15a is restricted from being released from the second recess 41 (see FIG. 6B).

The second recess 41 includes a second opening 41a and a second inner peripheral surface 41b. The second opening 41a is formed between the outer peripheral surface of the second protruding portion 39 and the second inner peripheral surface 41b of the second recess 41. The bottom portion of the second inner peripheral surface 41b is a substantially arc-shaped flat surface. A portion between the bottom portion of the second inner peripheral surface 41b and the second opening 41a is formed to have a substantially flat plane shape.

—Third Protruding Portion—

As illustrated in FIG. 5B, the third protruding portion 43 protrudes from the second body portion 37 and is formed to have a substantially columnar shape. The third protruding portion 43 is swingably disposed in a hole 21b (see FIG. 4) formed in the first side plate 21. The third protruding portion 43 is used as a swing shaft for the locking member 33.

In FIG. 5B, the shaft center of the third protruding portion 43 is indicated by the reference symbol "J2". The shaft center J2 of the third protruding portion 43 is concentric with the shaft center J1 of the first protruding portion 15a and the center of swing C2 of the locking member 33.

This embodiment deals with a case where both the second protruding portion 39 and the third protruding portion 43 are used as swing shafts for the locking member 33, but only one of the second protruding portion 39 and the third protruding portion 43 can be used as a swing shaft for the locking member 33.

—Engagement Portion—

As illustrated in FIG. 5A, the engagement portion 40 engages with the support member 31 at a position different to that of the second recess 41. More specifically, the engagement portion 40 engages with the engaged portion 35 located at a position different to that of the first recess 34.

The engagement portion 40 is a protruding portion that protrudes toward the first side cover 15 (example of a second protruding portion in the claims). The engagement portion 40 protrudes outward from the second body portion 37. For example, the engagement portion 40 protrudes from the second body portion 37 toward the first side cover 15. The engagement portion 40 is formed to have, for example, a columnar shape.

The engagement portion 40 engages with the engaged portion 35 (elongated hole) in the support member 31. For example, as illustrated in FIG. 6B, the engagement portion 40 is disposed at the first end portion 35a of the engaged portion 35 while the locking member 33 is at the rotation-restricting position. In this state, the second opening 41a in the second recess 41 is disposed to face the first inner peripheral surface 34b of the first recess 34.

Here, when the locking member 33 swings in the second direction of swing RP2, the engagement portion 40 moves along the engaged portion 35 to be positioned at the second end portion 35b of the engaged portion 35 (see FIG. 6A). With this configuration, the second opening 41a in the second recess 41 is disposed to face the first opening 34a in the first recess 34. In other words, the locking member 33 is disposed at the rotation-permitting position.

Note that the action of the locking member 33 moving in the first direction of swing RP1 is substantially identical to the action of the locking member 33 moving in the second direction of swing RP2 except for the difference in direction of swing RP. Therefore, a description of the locking member 33 moving in the first direction of swing RP1 is omitted herein.

Figure 8:
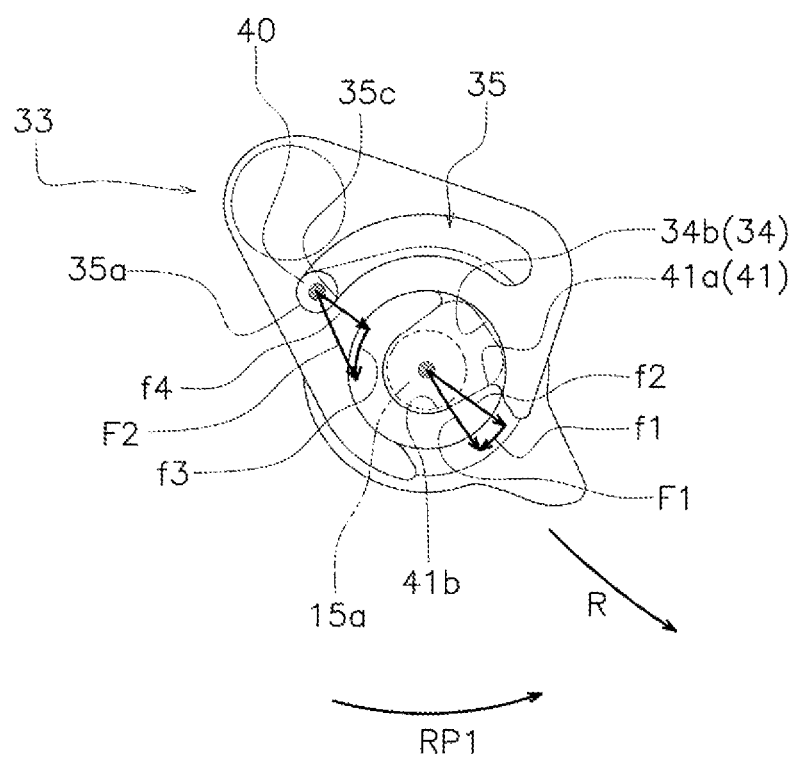
FIG. 8 is a diagram for explaining force that acts on the attachment/detachment mechanism.

Here, if the first side cover 15 is operated to rotate while the locking member 33 is at the rotation-restricting position as illustrated in FIG. 8, the engagement portion 40 presses the engaged portion 35 such that the locking member 33 is restricted from swinging from the rotation-restricting position to the rotation-permitting position.

More specifically, if the first side cover 15 is operated to rotate in the direction of rotation R while the locking member 33 is at the rotation-restricting position, a pressing force (a third component of force f3 to be described later) is generated in which the engagement portion 40 presses the engaged portion 35 in the first direction of swing RP1. This pressing force restricts the locking member 33 from swinging from the rotation-restricting position to the rotation-permitting position.

In more detail, the engagement portion 40 engages with the first end portion 35a of the engaged portion 35 while the locking member 33 is at the rotation-restricting position. In this state, the second opening 41a in the second recess 41 is disposed to face the first inner peripheral surface 34b of the first recess 34.

Here, the first protruding portion 15a presses the second inner peripheral surface 41b of the second recess 41 when the first side cover 15 is operated to rotate. In this case, a first main pressing force F1 in which the first protruding portion 15a presses the second recess 41 is generated. The engagement portion 40 presses an inner peripheral surface 35c of the engaged portion 35 closer to the first end portion 35a. In this case, a second main pressing force F2 in which the engaging portion 40 presses the engaged portion 35 is generated.

The first main pressing force F1 is divided into a first component of force f1 and a second component of force f2. The first component of force f1 is a component of force directed in the second direction of swing RP2. The second component of force f2 is a component of force directed in a radial direction away from the center of swing C2.

The second main pressing force F2 is divided into a third component of force f3 and a fourth component of force f4. The third component of force f3 is a component of force directed in the first direction of swing RP1. The third component of force f3 corresponds to the pressing force in which the engagement portion 40 presses the engaged portion 35 in the first direction of swing RP1. The fourth component of force f4 is a component of force directed toward the center of swing C2.

As illustrated in FIG. 8, when the first side cover 15 is operated to be rotated in the direction of rotation R while the locking member 33 is at the rotation-restricting position, the third component of force f3 acts to reduce the first component of force f1. Therefore, the locking member 33 is restricted from swinging from the rotation-restricting position to the rotation-permitting position.

Further, when the first side cover 15 is operated to rotate while the locking member 33 is at the rotation-restricting position, the fourth component of force f4 is transmitted from the support member 31 to the first side plate 21 via the engaged portion 35. In other words, the fourth component of force f4 is placed on the first side plate 21. Therefore, the second component of force f2 in which the first protruding portion 15a presses the second recess 41 is smaller than in the prior art.

(Bayonet Structure)

As illustrated in FIG. 3, the first side plate 21 and the shaft support portion 19 each include the bayonet structure 42. More specifically, the bayonet structure 42 is made up of the plurality of bayonet grooves 22a formed in the first side plate 21 and the bayonet protrusions 19d formed on the shaft support portion 19. The bayonet structure 42 has the same configuration as in the prior art, and hence only a brief description of the bayonet structure 42 is given herein.

As described above, the plurality of bayonet grooves 22a are formed on the outer peripheral surface of the first side plate 21 near the opening 21a with intervals therebetween in the circumferential direction. The bayonet protrusions 19d are formed on the outer peripheral surface of the shaft support portion 19 with intervals therebetween along the circumferential direction of the shaft support portion 19.

Engagement and disengagement of each bayonet protrusion 19d into/from each bayonet groove 22a is achieved when the first side cover 15 rotates, that is, when the shaft support portion 19 fixed to the first side cover 15 rotates.

A first state (engaged state illustrated in FIG. 3) where each bayonet protrusion 19d is disposed in each bayonet groove 22a is a state where the shaft support portion 19 is attached to the first side plate 21. In other words, in this first state, the first side cover 15 is positioned relative to the first side plate 21 using the shaft support portion 19.

A second state (disengaged state) in which each bayonet protrusion 19d is disposed between adjacent bayonet grooves 22a along the circumferential direction is a state where the shaft support portion 19 can be removed from the first side plate 21. In other words, in the second state, the first side cover 15 can be removed from the first side plate 21.

(1) With the dual-bearing reel 1 according to the present invention, the attachment/detachment mechanism 11 uses the support member 31 and the locking member 33 to permit or restrict rotation of the first side cover 15 relative to the first side plate 21. If the first side cover 15 is operated to rotate while the locking member 33 is at the rotation-restricting position, the engagement portion 40 of the locking member 33 presses the engaged portion 35 of the locking member 33 such that the locking member 33 is restricted from swinging from the rotation-restricting position to the rotation-permitting position.

With this configuration, the locking member 33 can be reliably held at the rotation-restricting position even when the first side cover 15 is operated to rotate while the locking member 33 is at the rotation-restricting position. In other words, with the dual-bearing reel 1 according to the present invention, the attachment/detachment mechanism 11 can be reliably operated at the rotation-restricting position.

(2) In the dual-bearing reel 1, the locking member 33 is restricted from rotating from the rotation-restricting position to the rotation-permitting position by a pressing force (third component of force f3) in which the engagement portion 40 of the locking member 33 presses the support member 31 in the first direction of swing RP1 when the first side cover 15 is operated to rotate while the locking member 33 is at the rotation-restricting position. With this configuration, the attachment/detachment mechanism 11 can be more reliably operated at the rotation-restricting position.

(3) In the dual-bearing reel 1, the engagement portion 40 of the locking member 33 is a protruding portion that protrudes toward the first side cover 15. With this configuration, the engagement portion 40 of the locking member 33 can be easily engaged with the engaged portion 35 of the support member 31.

(4) In the dual-bearing reel 1, the center of swing C2 of the locking member 33 is at a position different to the center of rotation C1 of the first side cover 15. With this configuration, rotation of the first side cover 15 can be easily restricted using the locking member 33.

(5) In the dual-bearing reel 1, the engaged portion 35 is an elongated hole extending in the direction of swing RP of the locking member 33. With this configuration, the engagement portion 40 of the locking member 33 can be easily engaged with the engaged portion 35 of the support member 31, and the locking member 33 can easily be made to swing.

(6) In the dual-bearing reel 1, the second recess 41 in the locking member 33 is located between the engaged portion 35 of the support member 31 and the first opening 34a in the first recess 34 in the support member 31. With this configuration, the pressing force that restricts the locking member 33 from swinging from the rotation-restricting position to the rotation-permitting position can be suitably applied from the engagement portion 40 of the locking member 33 to the engaged portion 35.

(7) In the dual-bearing reel 1, the first distance L1 between the first end portion 35a and the center of rotation C1 of the first side cover 15 is longer than the second distance L2 between the second end portion 35b and the center of rotation C1 of the first side cover 15. With this configuration, the pressing force that restricts the locking member 33 from swinging from the rotation-restricting position to the rotation-permitting position can be suitably applied from the engagement portion 40 of the locking member 33 to the engaged portion 35 of the support member 31.

(8) In the dual-bearing reel 1, the third distance L3 between the center of swing C2 of the locking member 33 and the center of rotation C1 of the first side cover 15 is shorter than the first distance L1 and longer than the second distance L2. With this configuration, the pressing force that restricts the locking member 33 from swinging from the rotation-restricting position to the rotation-permitting position can be suitably applied from the engagement portion 40 of the locking member 33 to the engaged portion 35 of the support member 31.

(9) In the dual-bearing reel 1, while the engaged portion 40 of the locking member 33 is engaged with the first end portion 35a of the engaged portion 35 of the support member 31, the second opening 41a in the second recess 41 in the locking member 33 is disposed to face the first inner peripheral surface 34b of the first recess 34 in the support member 31. Further, while the engaged portion 40 of the locking member 33 is engaged with the second end portion 35b of the engaged portion 35, the second opening 41a in the second recess 41 in the locking member 33 is disposed to face the first opening 34a in the first recess 34 in the support member 31.

With this configuration, the locking member 33 can be reliably held at the rotation-restricting position while the locking member 33 is at the rotation-restricting position. Further, the first side cover 15 can be easily operated to rotate while the locking member 33 is at the rotation-permitting position.

<Other Embodiments>

An embodiment of the present invention has been described above, but the present invention is not limited to the above-described embodiment and various changes can be made without departing from the gist of the invention. In particular, the embodiments described herein can be combined as necessary.

(a) The above-described embodiment deals with a case where the locking member 33 is a lever, but the locking member 33 can be a dial.

Figure 9:
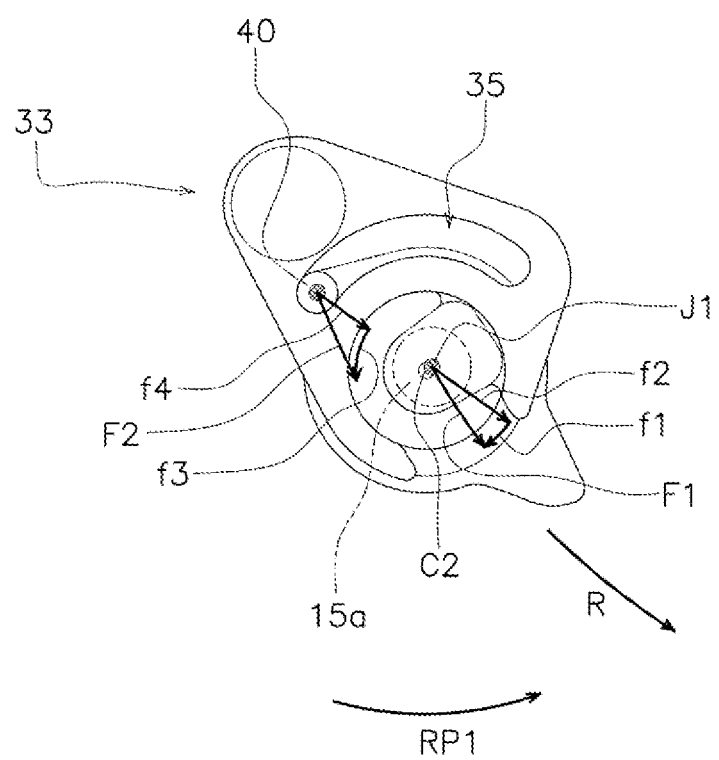
FIG. 9 is a side view of an attachment/detachment mechanism according to another embodiment of the present invention.

(b) The above-described embodiment deals with a case where the shaft center J1 of the first protruding portion 15a is concentric with the center of swing C2 of the locking member 33. As illustrated in FIG. 9, in place of the above-described configuration, the shaft center J1 of the first protruding portion 15a can be eccentric from the center of swing C2 of the locking member 33. Even with such a configuration, the same effect as in the above-described embodiment can be obtained.

REFERENCE SIGNS LIST 1 dual-bearing reel
3 reel body
11 attachment/detachment mechanism
15 first side cover
21 first side plate
31 support member
33 locking member
34 first recess
34a first opening
35 engaged member
35a first end portion
35b second end portion
40 engagement portion
41 second recess
41a second opening
C1 center of rotation
C2 center of swing
f3 third component of force
J1 shaft center of first protruding portion
J2 shaft center of third protruding portion
L1 first distance
L2 second distance
L3 third distance
R direction of rotation
RP direction of swing
RP1 first direction of swing
RP2 second direction of swing

What is claimed is:

1. A dual-bearing reel comprising:
a reel body including a frame with a side plate and a side cover for covering the side plate; and
an attachment/detachment mechanism including
an attachment/detachment operation portion configured to be operated when the side cover is attached to or detached from the side plate and configured to be rotatable relative to the side plate,
a first locking member mounted on the side plate, and
a second locking member configured to be swingable relative to the first locking member,
the attachment/detachment mechanism configured to permit or restrict rotation of the attachment/detachment operation portion relative to the side plate by using the first locking member and the second locking member,
the attachment/detachment operation portion including a first protruding portion that protrudes toward the side plate,
the second locking member configured to swing between a rotation-permitting position at which rotation of the attachment/detachment operation portion is permitted and a rotation-restricting position at which rotation of the attachment/detachment operation portion is restricted,
the second locking member including
a first recess that engages with the first protruding portion and
an engagement portion that engages with the first locking member at a position different to the first recess,
the first locking member including
a second recess that is open in a direction of rotation of the attachment/detachment operation portion and has the first recess disposed therein; and
an engaged portion that, when the attachment/detachment operation portion is operated to rotate while the second locking member is at the rotation-restricting position, is pressed by the engagement portion such that the second locking member is restricted from swinging from the rotation-restricting position to the rotation-permitting position.

2. The dual-bearing reel according to claim 1, wherein
a direction of swing of the second locking member includes a first swing direction in which the second locking member swings from the rotation-permitting position to the rotation-restricting position about a center of swing, and a second swing direction in which the second locking member swings from the rotation-restricting position to the rotation-permitting position about the center of swing, and
when the attachment/detachment operation portion is operated to rotate while the second locking member is at the rotation-restricting position, the engagement portion presses the engaged portion in the first swing direction to restrict the second locking member from swinging from the rotation-restricting position to the rotation-permitting position.

3. The dual-bearing reel according to claim 1, wherein
the engagement portion is a second protruding portion that protrudes toward the attachment/detachment operation portion.

4. The dual-bearing reel according to claim 3, wherein
the second locking member further includes a third protruding portion that protrudes toward the attachment/detachment operation portion, and
the first recess of the second locking member is formed in the third protruding portion.

5. The dual-bearing reel according to claim 4, wherein
the third protruding portion is swingably disposed in the second recess of the first locking member.

6. The dual-bearing reel according to claim 1, wherein
a center of swing of the second locking member is at a position different to a center of rotation of the attachment/detachment operation portion.

7. The dual-bearing reel according to claim 1, wherein
the engaged portion is an elongated hole extending in a direction of swing of the second locking member.

8. The dual-bearing reel according to claim 1, wherein the first recess is located between the engaged portion and an opening in the second recess.

9. The dual-bearing reel according to claim 8, wherein the engaged portion includes
a first end portion configured to engage with the engaged portion when the second locking member is at the rotation-restricting position, and
a second end portion disposed on a side opposite to the first end portion in a direction of swing in which the second locking member swings from the rotation-restricting position to the rotation-permitting position, the second end portion configured to engage with the engaged portion when the second locking member is at the rotation-permitting position, and
a first distance between the first end portion and a center of rotation of the attachment/detachment operation portion is longer than a second distance between the second end portion and the center of rotation of the attachment/detachment operation portion.

10. The dual-bearing reel according to claim 9, wherein a third distance between a center of swing of the second locking member and the center of rotation of the attachment/detachment operation portion is shorter than the first distance and longer than the second distance.

11. The dual-bearing reel according to claim 9, wherein while the engagement portion is engaged with the first end portion, an opening in the first recess is disposed to face an inner peripheral surface of the second recess, and
while the engagement portion is engaged with the second end portion, the opening in the first recess is disposed to face an opening in the second recess.

12. The dual-bearing reel according to claim 1, wherein the first locking member further includes a body portion, and
the second recess of the first locking member is recessed from an edge of the body portion.

\* \* \* \* \*